E. F. COOK.
Dampers for Stoves.

No. 145,989. Patented Dec. 30, 1873.

Witnesses: Inventor:

UNITED STATES PATENT OFFICE.

EDWARD F. COOK, OF OMAHA, NEBRASKA.

IMPROVEMENT IN DAMPERS FOR STOVES.

Specification forming part of Letters Patent No. 145,989, dated December 30, 1873; application filed August 30, 1873.

*To all whom it may concern:*

Be it known that I, EDWARD F. COOK, of Omaha, in the county of Douglas and State of Nebraska, have invented a new and useful Improvement in Dampers, of which the following is a specification:

The object of this invention is to provide means for retaining stove-dampers in any desired position when they are in use; and it consists in a hoop or ring attached to the damper-plate at right angles with the damper-spindle, so that the hoop or ring will bear against the pipe in which the damper is placed and hold the latter in position by the friction thus produced.

Figure 1:
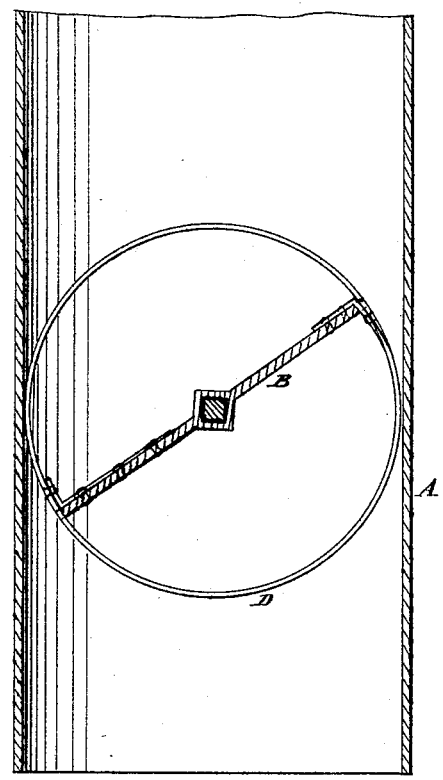
Figure 2:
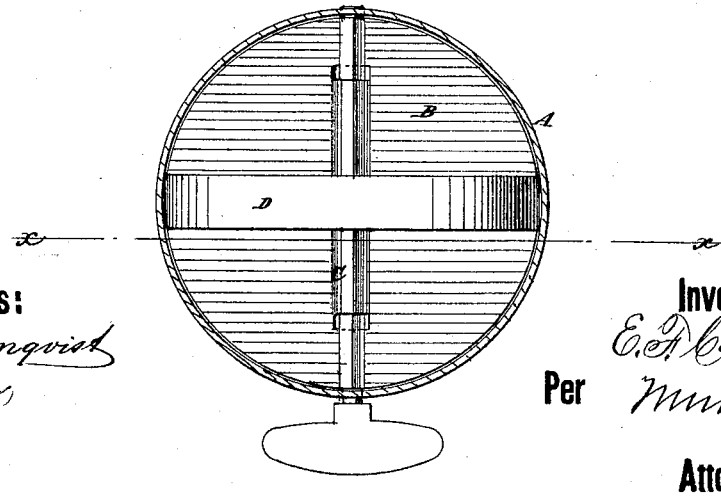

Figure 1 is a section of Fig. 2 taken on the line $x$ $x$. Fig. 2 is a cross-section, showing the damper in place.

Similar letters of reference indicate corresponding parts.

A is the pipe or tube, in which the damper is placed. B is the damper. C is the damper-spindle. The damper and spindle are made and placed in the pipe in the usual manner. D is a hoop or ring, made preferably of band or hoop iron, and consequently more or less elastic, attached to the damper at about right angles with the spindle, as seen in Fig. 2. In diameter this band slightly exceeds the diameter of the pipe A, so that when it is put in place and the damper is turned in either direction it will bind sufficiently against the inner surface of the pipe to hold the damper in any desired position.

This band or ring may be attached to the edge of the damper in any suitable manner, so that it is made to retain its position.

Having thus described my invention, I claim as new and desire to secure by Letters Patent—

The combination, with the damper B, of an elastic band or hook having a greater radius or diameter than said damper, as shown and described, to operate as specified.

EDWARD F. COOK.

Witnesses:
GEORGE D. PENNINGTON,
GEORGE W. WILLIAMS.